(12) United States Patent
Nakamura (10) Patent No.: US 11,154,811 B2
(45) Date of Patent: Oct. 26, 2021

(54) GAS FILTER

(71) Applicant: ENTEGRIS, Inc., Billerica, MA (US)

(72) Inventor: Yuki Nakamura, Billerica, MA (US)

(73) Assignee: Entegris, Inc., Billerica, MA (US)

( * ) Notice: Subject to any disclaimer, the term of this patent is extended or adjusted under 35 U.S.C. 154(b) by 433 days.

(21) Appl. No.: 16/087,210

(22) PCT Filed: Apr. 3, 2017

(86) PCT No.: PCT/US2017/025709
§ 371 (c)(1),
(2) Date: Sep. 21, 2018

(87) PCT Pub. No.: WO2017/176622
PCT Pub. Date: Oct. 12, 2017

(65) Prior Publication Data
US 2019/0099713 A1    Apr. 4, 2019

Related U.S. Application Data (60) Provisional application No. 62/319,498, filed on Apr. 7, 2016.

(51) Int. Cl.
*B01D 53/22* (2006.01)
*B01D 46/00* (2006.01)
(Continued)

(52) U.S. Cl.
CPC ......... *B01D 53/22* (2013.01); *B01D 46/0002* (2013.01); *B01D 46/0041* (2013.01);
(Continued)

(58) Field of Classification Search
CPC ............... B01D 53/22; B01D 46/0002; B01D 46/0041; B01D 46/10; B01D 53/0446;
(Continued)

(56) References Cited

U.S. PATENT DOCUMENTS 5,049,170 A      9/1991  Parnoff
5,965,019 A  *  10/1999  Olsen ................... B01D 27/005
                                                        210/331

(Continued)

FOREIGN PATENT DOCUMENTS

CN    101855441 A    10/2010
CN    101884864 A    11/2010
(Continued)

*Primary Examiner* — Anthony R Shumate (57) ABSTRACT

A gas filter includes a housing including a mounting portion and a main portion. The mounting portion is configured to mount the gas filter on a surface of a device. The main portion is configured to be positioned apart from the surface of the device and extends from the mounting portion in a horizontal direction. The housing has an inlet and an outlet and defines a flow channel between the inlet and the outlet. The flow channel has first and second channel portions, the first channel portion extending from the inlet to the second channel portion, the second channel portion extending in a direction substantially parallel to the horizontal direction. A filter member is positioned in the flow channel between the inlet and the outlet.

19 Claims, 8 Drawing Sheets

(51) Int. Cl.
  *B01D 46/10*   (2006.01)
  *B01D 53/04*   (2006.01)
(52) U.S. Cl.
  CPC ......... *B01D 46/10* (2013.01); *B01D 53/0446* (2013.01); *B01D 2257/204* (2013.01); *B01D 2257/206* (2013.01); *B01D 2258/0216* (2013.01)
(58) Field of Classification Search
  CPC ........ B01D 2257/204; B01D 2257/206; B01D 2258/0216
  See application file for complete search history.

(56) References Cited

U.S. PATENT DOCUMENTS

| | | | |
|---|---|---|---|
| 7,311,764 B2* | 12/2007 | Friday | A62B 23/02 128/201.25 |
| 8,343,345 B1* | 1/2013 | Perryman, Jr. | B01D 35/31 210/248 |
| 2002/0005379 A1* | 1/2002 | Willamson | B01D 35/043 210/433.1 |
| 2003/0106597 A1 | 6/2003 | Ichikawa et al. | |
| 2004/0173151 A1 | 9/2004 | Miwa | |
| 2005/0029172 A1* | 2/2005 | Buhl | B01D 35/147 210/133 |
| 2005/0230624 A1* | 10/2005 | Schubert | G01N 21/3504 250/339.13 |
| 2006/0163128 A1* | 7/2006 | Scragg | B01D 36/003 210/121 |
| 2007/0186775 A1 | 8/2007 | Diprizio et al. | |
| 2009/0065421 A1* | 3/2009 | Quintel | B01D 37/00 210/236 |
| 2015/0040525 A1* | 2/2015 | Werni | F01N 13/1838 55/332 |
| 2016/0370625 A1* | 12/2016 | Fontecchio | G02F 1/13342 |
| 2017/0341029 A1* | 11/2017 | Pigarev | B01D 63/043 |
| 2018/0050543 A1* | 2/2018 | Xing | B41J 2/145 |
| 2018/0318734 A1* | 11/2018 | Berg | B01D 29/15 |

FOREIGN PATENT DOCUMENTS

| | | |
|---|---|---|
| CN | 203108365 U | 8/2013 |
| CN | 104941387 A | 9/2015 |
| CN | 106536020 A | 3/2017 |
| JP | 06500952 A | 2/1994 |
| JP | 11165012 A | 6/1999 |
| JP | 2004108535 A | 4/2004 |
| JP | 2004247740 A | 9/2004 |
| JP | 2016174864 A | 10/2016 |
| TW | 277002 B | 6/1996 |
| TW | 201537020 A | 10/2015 |
| WO | 2015/178449 | 11/2015 |

* cited by examiner

GAS FILTER

RELATED APPLICATIONS

This application is filed under the provisions of 35 U.S.C. § 371 claiming priority of International Patent Application No. PCT/US2017/025709 filed on Apr. 3, 2017, which further claims the the benefit of priority under 35 U.S.C. § 119 of U.S. Provisional Patent Application No. 62/319,498, filed 7 Apr. 2016 is hereby claimed, the disclosures of which are incorporated herein by reference, in their entireties, for all purposes

BACKGROUND

Many of today's manufacturing processes required delivery of high purity gases at controlled low rates and pressures. In semiconductor manufacturing operations, wafer surfaces must be as clean as possible and purity and flow rate of gases must be carefully controlled to avoid defects in wafers. High purity hydrogen halide gases and other corrosive gases are utilized in the semiconductor industry in manufacturing processes such as etching of circuits and cleaning reactor vessels. In semiconductor manufacturing, gas can be provided to a process reactor through a gas panel. The gas panel can include a variety of components such as valves, pressure transducers, filters and other components to regulate gas flow and purify the gas.

There is a continuing need for the preparation of high purity process gases, such as halogen and halide gases, including hydrogen halides, nonmetal halides, and organohalides, to meet the purification demands of the semiconductor industry. Additionally, there is a need for a filter that minimizes length and height while fitting the footprint of a substrate block of a gas panel.

In semiconductor manufacturing, gas can be provided to a process reactor through a gas panel. The gas panel can include a variety of components such as valves, pressure transducers, filters and other components to regulate gas flow and purify the gas. A gas supply unit that includes fluid control devices and piping blocks is described in U.S. Pat. No. 7,017,609, incorporated herein by reference in its entirety. A low-profiled surface mount filter is described in U.S. Pat. No. 7,575,616, incorporated herein by reference in its entirety.

SUMMARY

The embodiments disclosed herein pertain to methods of filtration and filters for removing impurities from a gas stream. In particular, the embodiments pertain to gas filters that can be mounted on a surface of a device and that are capable of being placed within a small place.

A version of a gas filter includes a housing including a mounting portion and a main portion. The mounting portion is configured to mount the gas filter on a surface of a device. The main portion is configured to be positioned apart from the surface of the device and extends from the mounting portion in a horizontal direction. The housing has an inlet and an outlet and defines a flow channel between the inlet and the outlet. The flow channel has first and second channel portions, the first channel portion extending from the inlet to the second channel portion, the second channel portion extending in a direction substantially parallel to the horizontal direction. A filter member is positioned in the flow channel between the inlet and the outlet.

A method of filtering a gas includes directing a stream of gas through a version of a gas filter and capturing impurities within the gas at the filter member.

BRIEF DESCRIPTION OF THE DRAWINGS

The foregoing will be apparent from the following more particular description of example embodiments as illustrated in the accompanying drawings in which like reference characters refer to the same parts throughout the different views. The drawings are not necessarily to scale, emphasis instead being placed upon illustrating the various embodiments.

DETAILED DESCRIPTION

While the embodiments of gas filters will be particularly shown and described with references to various examples thereof, it will be understood by those skilled in the art that various changes in form and details may be made therein without departing from the scope of the appended claims.

While various compositions and methods are described, it is to be understood that the embodiments disclosed are not limited to the particular compositions, designs, methodologies or protocols described, as these may vary. It is also to be understood that the terminology used in the description is for the purpose of describing the particular versions or versions only, and is not intended to limit the scope of the present of these embodiments which will be limited only by the appended claims.

It must also be noted that as used herein and in the appended claims, the singular forms "a", "an", and "the" include plural reference unless the context clearly dictates otherwise. Thus, for example, reference to a "filter member" is a reference to one or more filter members and equivalents thereof known to those skilled in the art, and so forth. Unless defined otherwise, all technical and scientific terms used herein have the same meanings as commonly understood by one of ordinary skill in the art. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A conventional gas filter is typically arranged in line with a device or on a top surface of the device (so-called tower filter) and can occupy a relatively large amount of space. In contrast, a gas filter in embodiments of the disclosure can have the same footprint as a mounting portion to mount the filter to a surface of the device and can be arranged on the device in a similar manner as conventional filters while occupying a smaller space. In embodiments of the disclosure, an L-shape flow channel is provided in the gas filter, which can achieve a simpler flow path as compared to a conventional surface mounted gas filter while at the same time allowing for a large gas flow volume.

Chemical vapor deposition (CVD) is a chemical process used to produce high quality, high-performance, solid materials. The process is often used in the semiconductor industry to produce thin films. Low-pressure CVD (LPCVD) refers to CVD at sub-atmospheric pressures.

Integrated Gas System (IGS) refers to a device that supplies a high purity gas to equipment of a semiconductor manufacturing process.

Figure 1A:
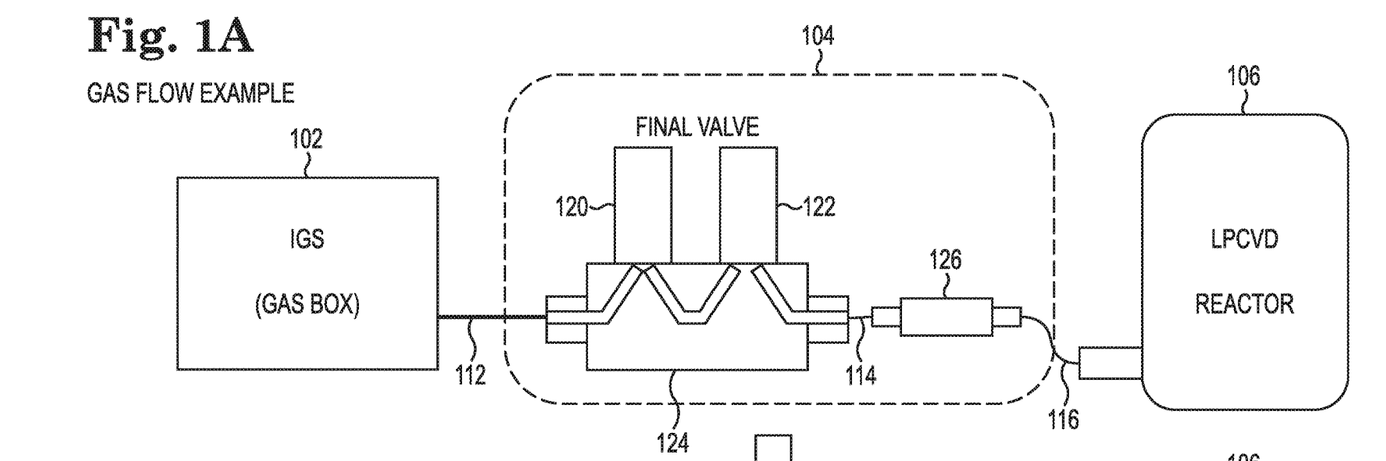
FIG. 1A is a schematic diagram illustrating gas flow in a manufacturing process including a conventional gas filter.

FIG. 1A is a schematic diagram illustrating gas flow in a manufacturing process. Gas flows from a source of gas 102, here an IGS, through a gas panel 104 to a process reactor 106, here a LPCVD reactor. Gas panel 104 is connected to IGS 102 via line 112 and to reactor 106 via lines 114 and 116 and a conventional filter 126. Gas enters gas panel 104 through line 112 and is routed via piping in substrate block 124 and valves 120 and 122, which are mounted on the substrate block, and to gas filter 126. As shown, gas filter 126 is connected in-line and is separated from substrate block 124.

Figure 1B:
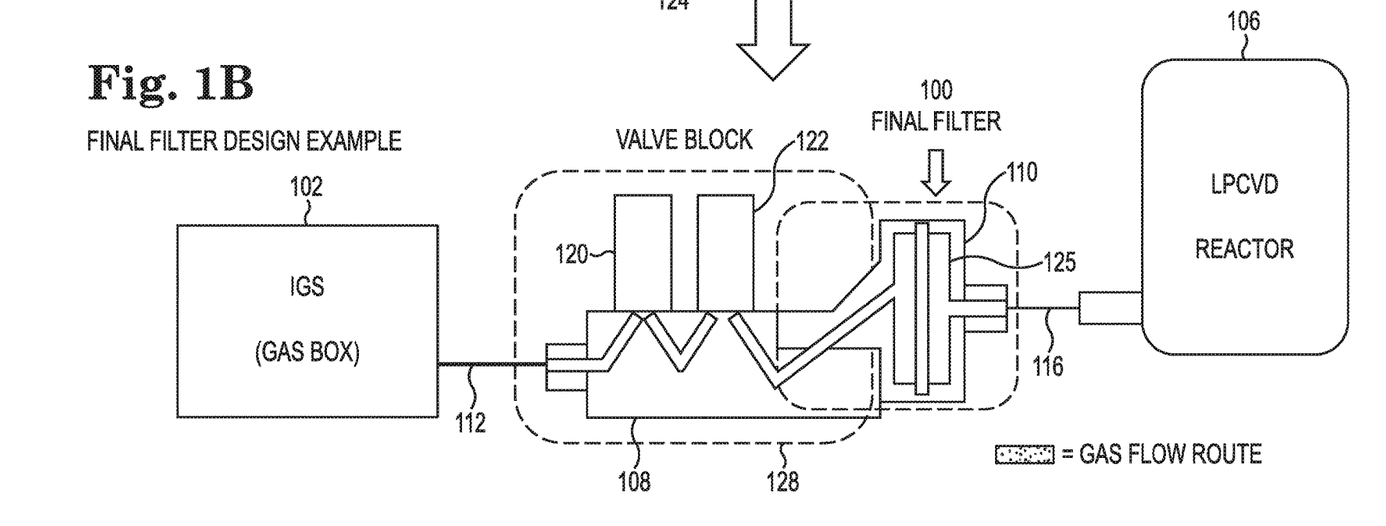
FIG. 1B is a schematic diagram illustrating gas flow in a manufacturing process including an example version of a gas filter.

FIG. 1B schematically illustrates an example version of a gas filter 100 which is deployed in a gas flow path of a manufacturing process. As in the process illustrated in FIG. 1A, gas is delivered from source 102 (IGS) to reactor 106 via lines 112 and 116 and a valve block 128 that includes a substrate block 108. Gas filter 100, however, is mounted to a surface of substrate block 108, allowing for a more compact, space-saving design. Gas filter 100 includes a housing 110 in which a filter member 125 is positioned. As illustrated, gas filter 100 receives gas directly from piping of substrate block 108. The gas is filtered by directing a stream of gas through gas filter 100 and capturing impurities within the gas at filter member 125. Gas filter 100 is a final filter before the purified gas is delivered to reactor 106.

Figure 2A:
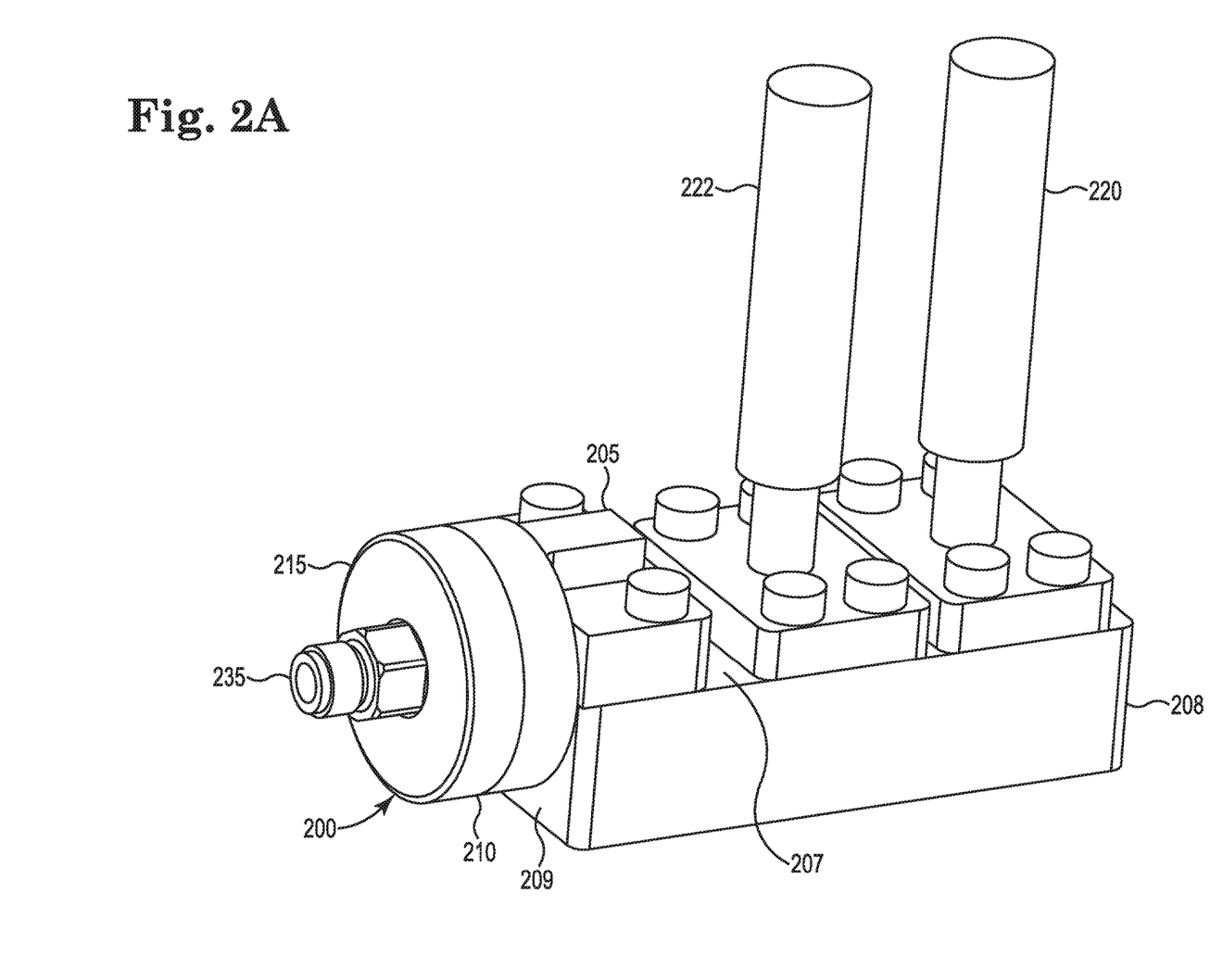
FIG. 2A is a perspective view of an example gas filter mounted on a device.

FIG. 2A is a perspective view of an example gas filter 200 mounted on a device 208. Device 208 can be a component of a gas panel, such as substrate block 108 illustrated in FIG. 1B. In the example, valves 220 and 222 are surface mounted to device 208. Filter 200 includes a housing 210 that includes a mounting portion 205 and a main portion 215. Mounting portion 205 is configured to mount gas filter 200 on a top surface 207 of device 208. Main portion 215 extends from mounting portion 205 in a horizontal direction. As shown, main portion 215 is positioned apart from surface 207 of device 208 and extends along a side 209 of the device. A portion of mounting portion 205 also extends alongside surface 209. In general, the portion of housing 210 of filter 200 that is configured to house the filter member is positioned to the side of device 208. Such an arrangement serves to minimize height and length requirements. In the example shown, main portion 215 of housing 210 has a cylindrical shape. Mounting portion 205 also has a cylindrical portion where mounting portion abuts and attaches to main portion 215.

Figure 2B:
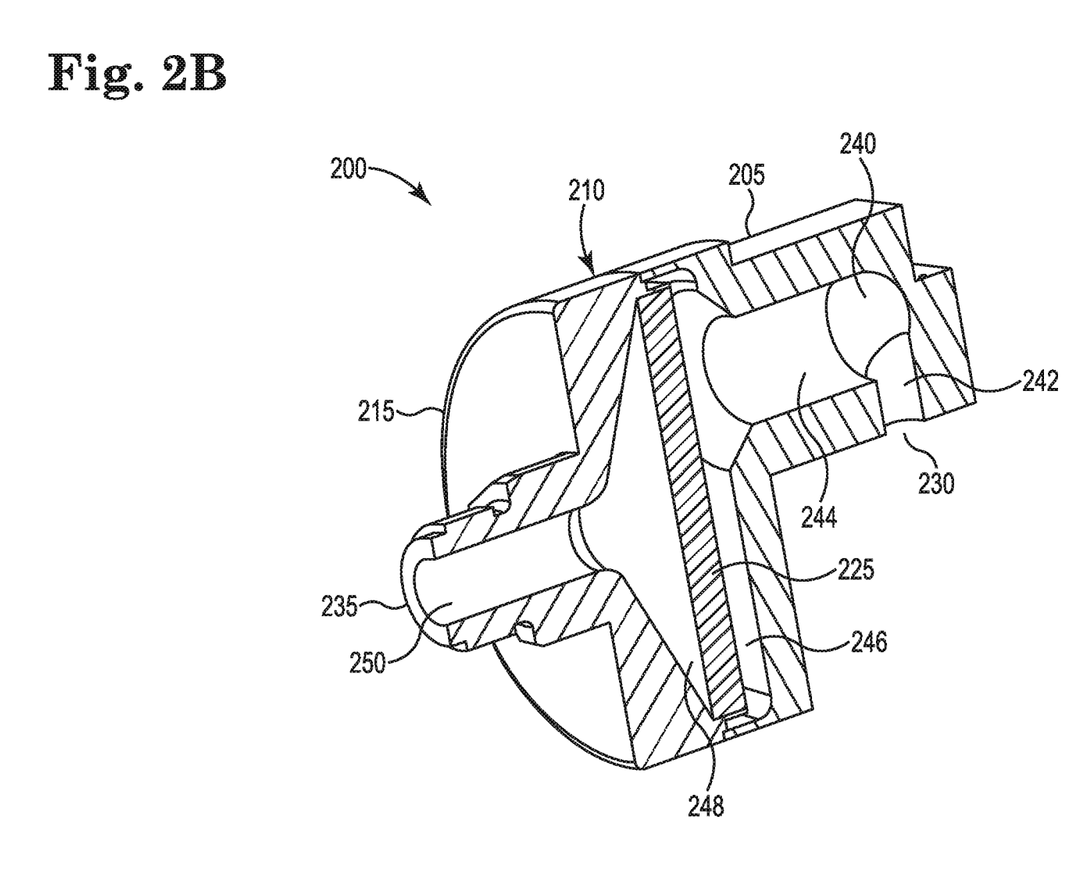
FIG. 2B is a sectional view of the gas filter of FIG. 2A.
Figure 3A:
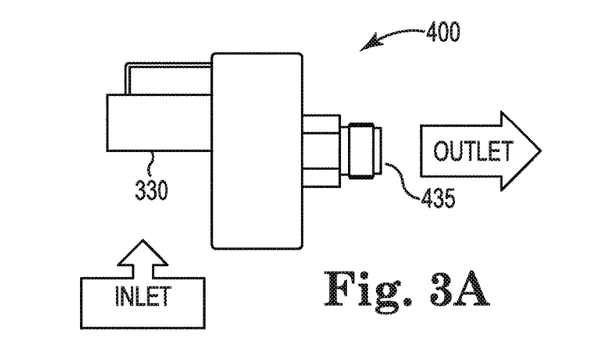
FIGS. 3A-3E are side, top, bottom, back and front views, respectively, of an example gas filter.
Figure 3B:
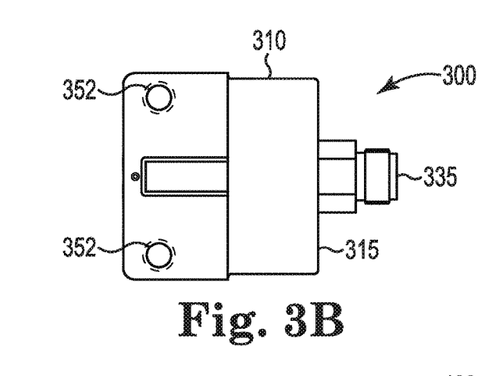
Figure 3C:
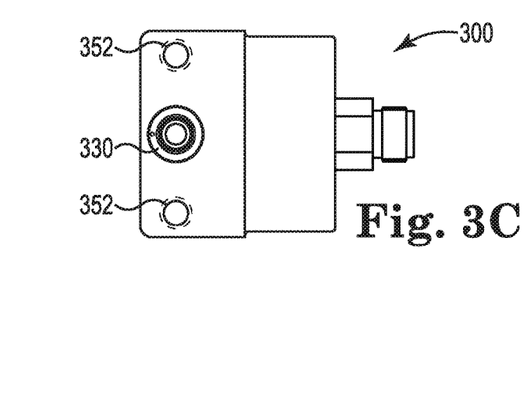
Figure 3D:
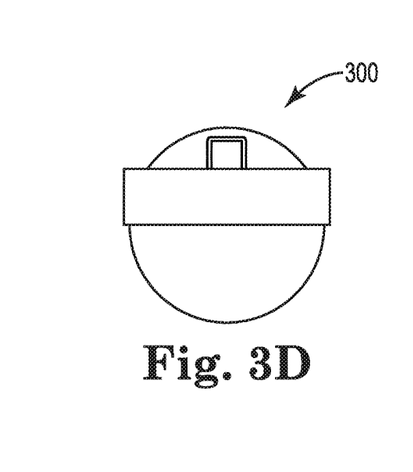
Figure 3E:
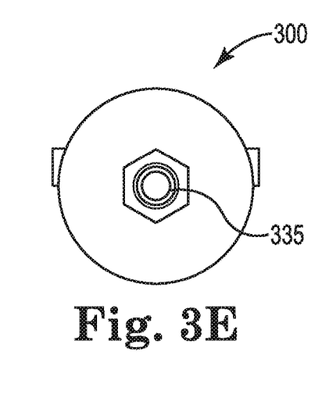

FIG. 2B is a sectional view of gas filter 200 of FIG. 2A, illustrating internal components of the filter. Housing 210 has an inlet 230 and an outlet 235 and defines a flow channel 240 between the inlet and the outlet. Flow channel 240 has first and second channel portions 242 and 244, respectively. First channel portion 242 extends from inlet 230 to second channel portion 244. As shown, second channel portion 244 extends in a direction substantially parallel to the horizontal direction. In this example, first channel portion 242 extends in a direction substantially perpendicular to the direction of second channel portion 244. Thus, first and second channel portions 242, 244 form an L-shaped conduit for gas to flow from inlet 230 to a filter member 225. A filter member 225 is positioned in housing 210, i.e., in flow channel 240 between inlet 230 and outlet 235. Other configurations are contemplated.

Flow channel 240 includes a chamber, formed of two parts 246, 248 and defined by housing 210. Filter member 225, which in this example is a disc, is positioned in the chamber. The chamber has a larger cross-sectional area than any other portion of flow channel 240. The larger cross-section area of the chamber allows for a large flow volume through filter member 225. A passage 250 is defined in main portion 215. Passage 250 communicates with chamber 246, 248 and with outlet 235. As shown, outlet 235 is vertically offset from second channel portion 244. Alternatively, outlet 235, chamber 246, 248 and second channel portion 244 could be aligned along a central axis of housing 210.

In the example shown, filter member 225 is attached to (e.g., welded to) main portion 215. This can facilitate manufacturing of the gas filter. Alternatively, filter member 225 can be attached to mounting portion 205. To make the gas filter, filter member 225 is attached to one of the portions of housing 210 and then the portions are attached (e.g., welded to) each other.

Filter member 225 can be a disc filter or a membrane. Filter member 225 can be arranged in a vertical direction to create a large flow channel and volume. Main portion 215 of housing 210 can extend downwardly, along a side of device 108, and up to the bottom of the device so as to gain a large flow volume through filter member 225. Gas filter 200 can be arranged generally in the same direction as the gas flow direction within a small space.

One embodiment of a gas filter 200 comprises a housing 210 including a mounting portion 205 and a main portion 215, the mounting portion 205 configured to reversibly fluidly seal the gas filter 200 on a first surface 207 of a device 208, the main portion 215 configured to be positioned apart from the surface 207 of the device 208 and adjacent to, and optionally in contact with, a second surface 209 of the device 208. The main portion 215 extending from the mounting portion in a horizontal direction, the housing 210 having an inlet 230 and an outlet 235 and defining a flow channel 240 between the inlet and the outlet. A filter member 225 with opposing substantially parallel faces positioned in the flow channel between the inlet and the outlet, the filter member 225 is attached to the main portion 215 so that when the filter 200 is mounted to a first surface 207 of device 208, the filter member 225 is substantially parallel to the second surface 209 of device 208.

FIGS. 3A-3E are side, top, bottom, back and front views, respectively, of an example gas filter 300. Similar to gas filter 200, gas filter 300 includes a housing 310 formed of a mounting portion 305 and a main portion 315. Gas enters filter 300 through an inlet 330, passes through a filter member (not shown) inside housing 310, and exits through outlet 335. Mounting portion 305 includes inlet 330 and main portion 315 includes outlet 335. Through holes 352 are provided in mounting portion 305. Holes 352 can receive fasteners (e.g., bolts, screws etc.) to mount filter 300 to a device, as illustrated for filter 200 in FIG. 2A.

FIGS. 4A-4F illustrate an example gas filter 400, which is substantially similar to gas filter 300. Elements of filter 400 corresponding to elements of filter 300 have been numbered with corresponding reference numerals incremented by 100. Gas filter 400 includes a housing 410 formed of a mounting portion 405 and a main portion 415. Through holes 452 are provided in mounting portion 405 to mount filter 400 to a device using suitable fasteners. Gas enters filter 400 through an inlet 430 at mounting portion 405, passes through a filter member 425 positioned inside housing 410, and exits through outlet 435 at main portion 415.

Figure 4A:
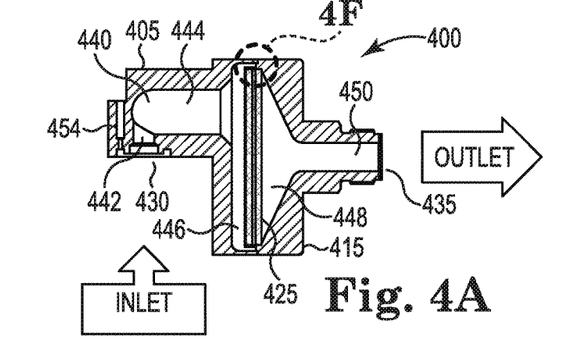
FIGS. 4A-4E are sectional, top, bottom, back and front views, respectively, of an example gas filter.
Figure 4B:
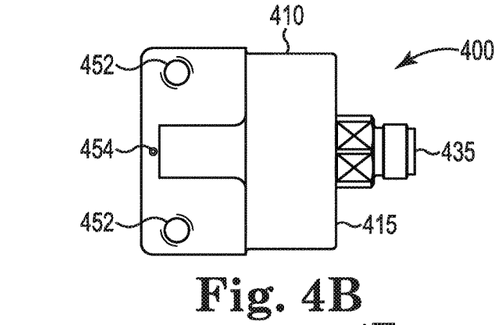
Figure 4C:
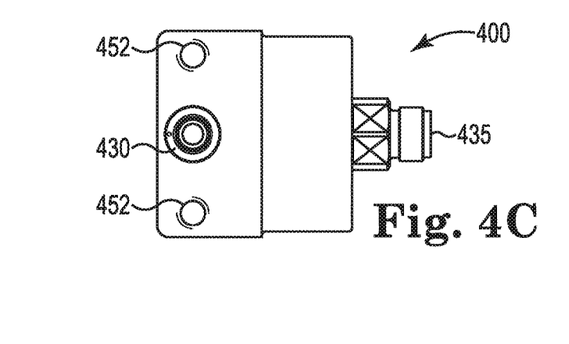
Figure 4D:
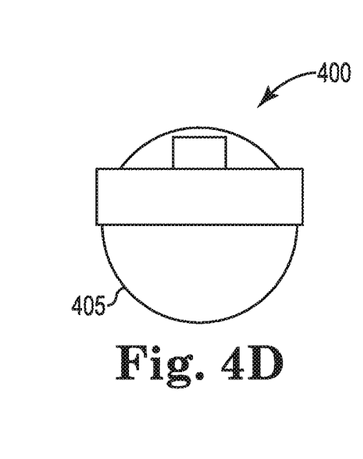
Figure 4E:
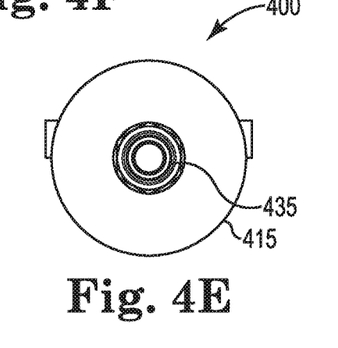

As shown in FIG. 4A, filter member 425 can include two parallel surfaces, the surfaces positioned substantially perpendicular to the horizontal direction. Filter member 425 can include a membrane and can be disc-shaped. Filter member is position in line with flow channel 440. Flow channel 440 has first and second channel portions 442 and 444, respectively. First channel portion 442 extends from inlet 430 to second channel portion 444. As shown, second channel portion 444 extends in a direction substantially parallel to the horizontal direction, while first channel portion 442 extends in a direction substantially perpendicular to the direction of second channel portion 444. Filter member 425 is positioned in a chamber 446, 448 defined by housing 410. A first portion 446 of the chamber is defined by mounting portion 405 and a second portion 448 of the chamber is defined by main portion 415. The chamber is sized and shaped to fit the particular requirements of flow of gas through filter member 425.

A passage 450 is defined in main portion 415 of gas filter 400. Passage 450 communicates with chamber 446, 448 and with outlet 435. As shown, a center axis of outlet 435 and passage 450 is offset from a center axis of second channel portion 444. Alternatively, outlet 435, chamber 446, 448 and second channel portion 444 can be aligned along a common axis, which may be a central axis through housing 410.

Filter member 425 can include a sintered material having a plurality of layers. In the example shown, filter member 425 includes at least three layers, an inner layer 462 and two outer layers 464 and 466, as best seen in the detailed view presented in FIG. 4F. Additional layers may be present but are not shown for simplicity of illustration.

Figure 4F:
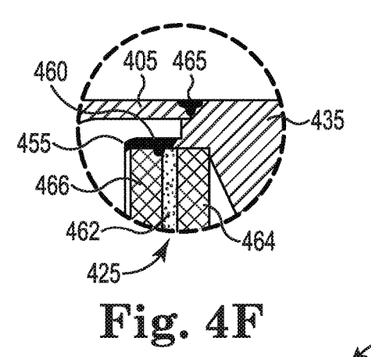
FIG. 4F is a detail view of the gas filter of FIG. 4A.

As illustrated in FIG. 4F, filter member 425 is welded to main portion 415 of gas filter 400. Main portion 415 includes a flange 455 that encircles the outer edge of filter member 425. Using welding to bond filter member 425 to flange 455 ensures that particles cannot get by the filter member and are filtered from gas passing through the filter member. Welding is particularly suitable for attaching filter members having multiple metal layers that are sandwiched together. Other means of sealingly attaching a filter member 425 to main portion 415 may be used.

In a particular example, filter member 425 is welded to flange 455 using laser welding after caulking flange 455, as illustrated at 460. After welding, the surface of the weld area is finished using an electro-polish finishing procedure. A YAG laser welding machine may be used. Such a machine includes yttrium-aluminum-garnet (YAG) at the edge of the machine that is transmitting the laser beam. Caulking is useful to secure parts to be welded prior to welding and is further described with reference to FIG. 7.

As illustrated in FIG. 4F, laser welding using a YAG laser can also be used to attach main portion 415 to mounting portion 405, as illustrated at 465. The welding region at the outside of housing 410 can be ground to achieve a smooth outer finish.

FIGS. 5A-5G illustrate further details and example dimensions of mounting portion 405 of gas filter 400, while FIGS. 6A-6D illustrate further details and example of main portion 415 of gas filter 400.

Figure 5A:
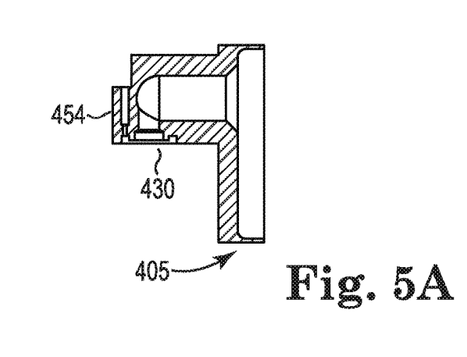
FIGS. 5A-5E are sectional, top, bottom, back and front views, respectively, of a mounting portion the gas filter of FIG. 4A.
Figure 5B:
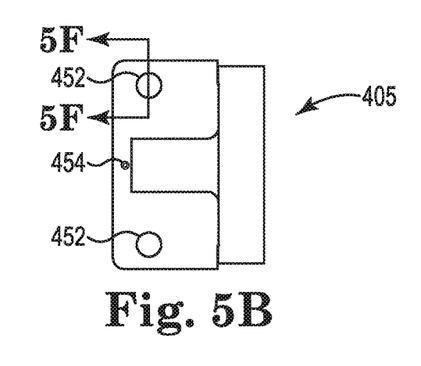
Figure 5C:
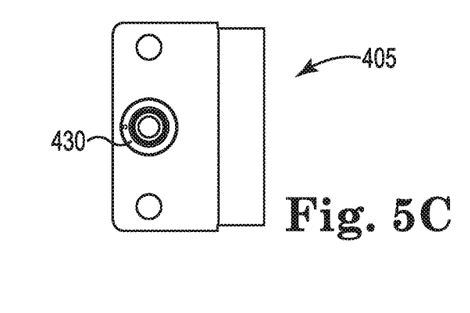
Figure 5D:
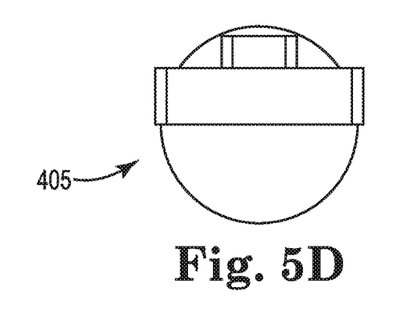

As shown in FIGS. 5A-5C, mounting portion 405 can include a bore 454 that communicates with a circular recess at inlet 430. Bore 454, also called a leak port, is part of the surface mount fitting at inlet 430, which, in the example shown, is a W-seal fitting.

Figures 5E, 5F:
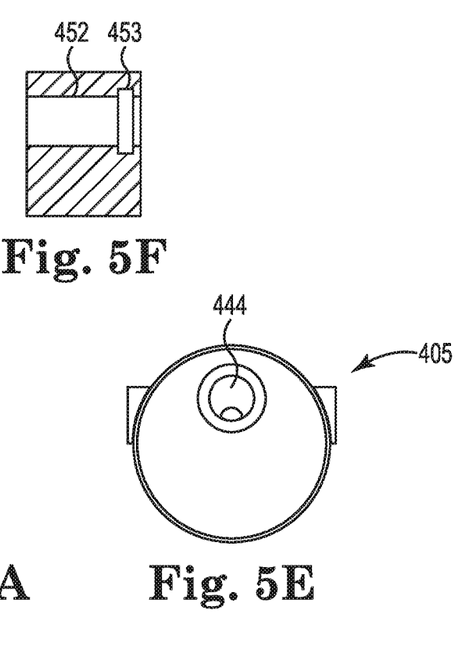
FIG. 5F is a sectional view illustrating a detail of the mounting portion of FIG. 5B.

FIG. 5F shows a detailed sectional view of mounting hole 452 in portion 405. Hole 452 can vary in diameter along the length of the bore of the hole. As shown, hole 452 can include a portion 453 having a larger diameter. The larger diameter portion can be sized to hold an O-ring, which is standard design of a W-seal fitting.

Figure 5G:
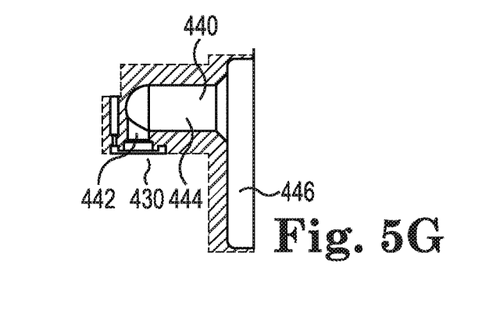
FIG. 5G is a sectional view of the mounting portion of the gas filter of FIG. 4A illustrating example surface finishing of interior surfaces of the mounting portion.

FIG. 5G is sectional view of mounting portion 405 of gas filter 400 illustrating example surface finishing of interior surfaces of the mounting portion. In the example shown, mounting portion 405 of housing 410 has an electro-polished surface finish on fluid-facing surfaces. Electro-polishing (also known as electrochemical polishing or electrolytic polishing), is an electrochemical process that removes material from a metallic workpiece. Electro-polishing can be used to polish, passivate, and deburr metal parts, to achieve very smooth, microscopically featureless surfaces. Surface roughness is commonly measured or classified in Ra (Roughness average). Electro-polishing generally reduces surface roughness measurements. Other suitable surface finishes may be used to meet requirements of a particular application.

Figure 6A:
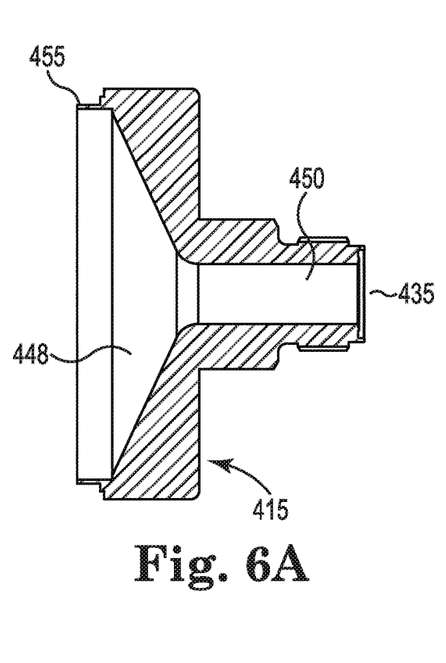
FIGS. 6A-6C are sectional, front and back views, respectively of a main portion of the gas filter of FIG. 4A.
Figure 6B:
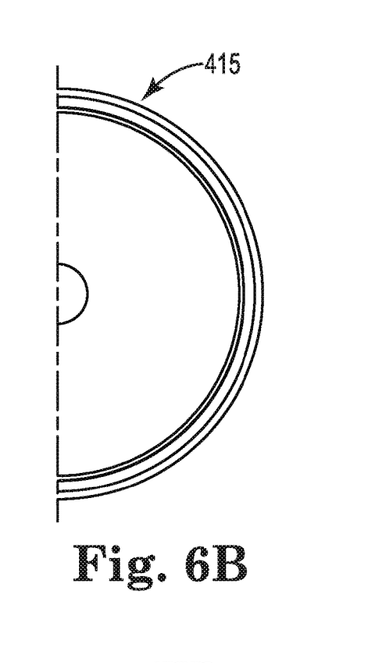
Figure 6C:
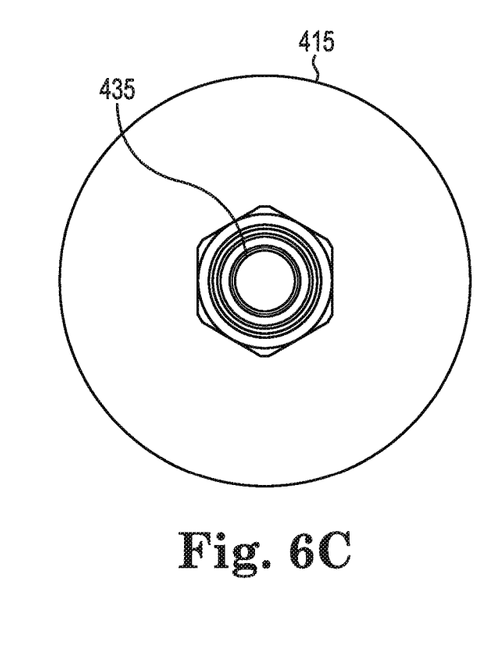

FIG. 6A illustrates the funnel-shaped interior space of main portion 415. Main portion 415 has a larger diameter at flange 455, where filter member 425 (FIG. 4A) is positioned, than at the rest of the interior space. Chamber 448 tapers from a larger diameter at flange 455 to a smaller diameter at passage 450.

Figure 6D:
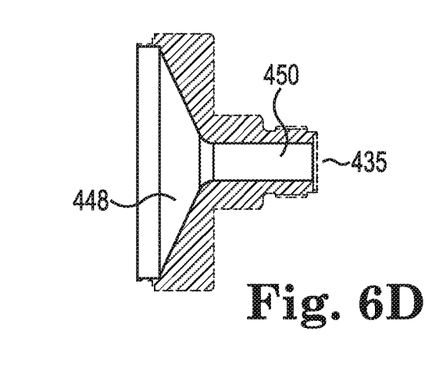
FIG. 6D is a sectional view of the main portion of the gas filter of FIG. 4A illustrating example surface finishing of the interior surfaces of the main portion.

FIG. 6D is a sectional view of main portion 415 of gas filter 400 illustrating example surface finishing of the interior surfaces of main portion 415. In the example shown, main portion 415 of housing 410 has an electro-polished surface finish on fluid-facing surfaces.

Figure 7:
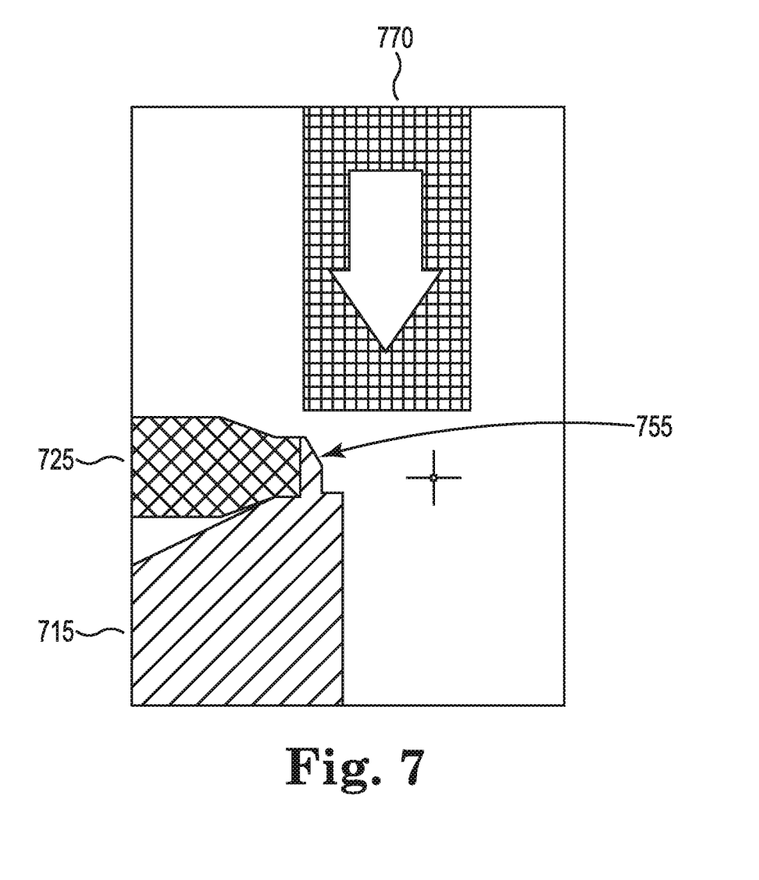
FIG. 7 is a schematic illustration of a process for caulking a flange of a main portion of a gas filter to secure a filter member.

FIG. 7 is a schematic illustration of a process for caulking a flange 755 of a main portion 715 of a gas filter prior to welding flange 755 to a filter member 725. Filter member 755 is positioned in main portion 715. A tool 770 is used to bend flange 755 over the edge of filter member 725. Tool 770 can be lowered onto flange 755 and apply force to bend a portion of flange 755 to secure filter member 725. Main portion 715 and filter member 725 can be rotated while tool 770 is used to bend flange 755. Caulking of flange 755 prepares the flange for subsequently welding the flange to filter member 725.

Types of gas that may be used with an example version of a gas filter are process gases, such as process gases commonly used in semiconductor manufacturing processes, including LPCVD. Example gases include $SiH_4$, $PH_3$, DCS, $NH_3$, $B_2H_6$, $N_2O$, $N_2$, Ar, $O_2$, and the like.

Gas filter 100, 200, 300 and 400 can be configured to withstand operational parameters typically found in semiconductor manufacturing processes. Parameters can include pressures and temperatures associated with the manufacturing process, such as, for example, pressure and temperature of a gas passing through the filter. In an example version of a gas filter, the gas filter is capable of withstanding operational parameters that include a maximum inlet pressure of 0.3 MPa-Vac and a maximum temperature of 200 degrees C.

Suitable materials for manufacturing the housing of the gas filter are stainless steel materials, such as 316LSS-B, and corrosion resistant metal alloys, such as HASTELLOY® alloys (Haynes International, Inc.). HASTELLOY alloys are highly corrosion-resistant metal alloys, often referred to as "superalloys" or "high-performance alloys," whose predominant alloying ingredient is typically the transition metal nickel. Other alloying ingredients are added to nickel and include varying percentages of the elements molybdenum, chromium, cobalt, iron, copper, manganese, titanium, zirconium, aluminum, carbon, and tungsten.

Filter member 125, 225 and 425 can be, for example, ENTEGRIS® filter member GF-02459. Other conventional filter members, either multi-layer or single-layer, can be used. For example, an inner layer of material can be sandwiched between two outer layers of material. The inner layer can itself include, of be formed from, multiple layers of material. The number of layers of material can range, for example, from 1 to 10, although more layers can be used. The filter member may be formed by stacking layers of material, applying pressure and sintering.

Filter member 125, 225, 425 can include one or more layers of material. The layers can be sintered. A layer can be formed as a mesh, a non-woven, or a porous layer of material. Suitable materials for the filter member include metal, such as stainless steel, metal alloys, such as HASTELLOY® alloys, or other materials that can withstand the gases that are being purified. Some of the gases can be highly corrosive. Other examples of filter materials include ceramic materials, TEFLON® materials (E.I. du Pont de Nemours and Company, Wilmington, Del.) and other filter materials. TEFLON material is based on Polytetrafluoroethylene (PTFE), a synthetic fluoropolymer of tetrafluoroethylene.

The inlet of gas filter 100, 200, 300, and 400 can be configured with any suitable fitting (connector) to sealably connect the gas filter to a surface of device, such as a substrate block of a gas panel, while allowing for surface mount of the gas filter. A suitable fitting is a W-seal surface mount fitting, such as shown in FIGS. 3A, 3C, 4A, 4C, 5A and 5C.

The outlet of gas filter 100, 200, 300 and 400 can be configured with any suitable fitting to sealably connect the gas filter to a downstream component, such as a reactor chamber. A suitable fitting is a Metal Gasket Fitting, such as a UPG fitting, as, for example, shown in FIGS. 3A-3C, 3E, 4A-4C, 4E, 6A and 6C.

Although the embodiments of various gas filters and methods of using them have been shown and described with respect to one or more implementations, equivalent alterations and modifications will occur to others skilled in the art based upon a reading and understanding of this specification and the annexed drawings. The gas filters includes all such modifications and alterations and is limited only by the scope of the following claims. In addition, while a particular feature or aspect of an embodiment may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although embodiments of gas filters and methods of using them have been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A gas filter, comprising:
   a housing including a mounting portion and a main portion, the mounting portion configured to mount the gas filter on a first surface of a device, the main portion configured to be positioned apart from the surface of the device, the main portion extending from the mounting portion in a horizontal direction and extending along a second surface of the device, the housing having an inlet and an outlet and defining a flow channel between the inlet and the outlet, the flow channel having first and second channel portions, the first channel portion extending from the inlet to the second channel portion, the second channel portion extending in a direction substantially parallel to the horizontal direction; and
   a filter member positioned in the flow channel between the inlet and the outlet.

2. The gas filter of claim 1, wherein first channel portion extends in a direction substantially perpendicular to the direction of the second channel portion.

3. The gas filter of claim 1, wherein the flow channel includes a chamber defined by the housing, the filter member being positioned in the chamber.

4. The gas filter of claim 3, wherein the chamber has a larger cross-sectional area than any other portion of the flow channel to gain a large flow volume through the filter member.

5. The gas filter of claim 1, wherein the mounting portion of the housing is configured to also extend along the second surface of the device.

6. The gas filter of claim 1, wherein the main portion of the housing has a cylindrical shape.

7. The gas filter of claim 1, wherein the mounting portion of the housing includes the inlet, and wherein the main portion of the housing includes the outlet.

8. The gas filter of claim 1, wherein the filter member includes two parallel surfaces, the surfaces positioned substantially perpendicular to the horizontal direction.

9. The gas filter of claim 1, wherein the filter member includes a membrane.

10. The gas filter of claim 1, wherein the filter member includes a sintered material having a plurality of layers.

11. The gas filter of claim 1, wherein the filter member is welded to the main portion of the gas filter.

12. The gas filter of claim 1, wherein the filter member is a disc.

13. A gas filter, comprising:
   a housing including a mounting portion and a main portion, the mounting portion configured to mount the gas filter on a surface of a device, the main portion configured to be positioned apart from the surface of the device, the main portion extending from the mounting portion in a horizontal direction, the housing having an inlet and an outlet and defining a flow channel between the inlet and the outlet, the flow channel having first and second channel portions, the first channel portion extending from the inlet to the second channel portion, the second channel portion extending in a direction substantially parallel to the horizontal direction; and
   a filter member positioned in the flow channel between the inlet and the outlet, wherein the filter member and the outlet are concentrically aligned.

14. The gas filter of claim 1, wherein the outlet is offset from the second channel portion.

15. The gas filter of claim 1, wherein the housing has an electro-polished surface finish on fluid-facing surfaces.

16. A method of filtering a gas, the method comprising:
   directing a stream of gas through the gas filter of claim 1; and
   capturing impurities within the gas at the filter member.

17. The gas filter of claim 1, wherein the main portion is configured to be adjacent to the second surface.

18. The gas filter of claim 1, wherein the main portion is configured to be in contact with the second surface.

19. The gas filter of claim 1, wherein, when the gas filter is mounted to the first surface of the device, the filter member is substantially parallel to the second surface of the device.

* * * * *